United States Patent
Hu

(10) Patent No.: US 9,313,303 B2
(45) Date of Patent: Apr. 12, 2016

(54) ELECTRONIC DEVICE HAVING ELECTRONIC CARD CONNECTOR

(71) Applicant: ScienBiziP Consulting (Shen Zhen) Co., Ltd., Shenzhen (CN)

(72) Inventor: Chia-Jui Hu, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/518,127

(22) Filed: Oct. 20, 2014

(65) Prior Publication Data
US 2015/0118884 A1    Apr. 30, 2015

(30) Foreign Application Priority Data
Oct. 31, 2013    (CN) .......................... 2013 1 0525942

(51) Int. Cl.
*H01R 13/44*    (2006.01)
*H04M 1/02*    (2006.01)
*H04B 1/3816*    (2015.01)
*G06K 13/08*    (2006.01)

(52) U.S. Cl.
CPC ........... *H04M 1/026* (2013.01); *G06K 13/0831* (2013.01); *H04B 1/3816* (2013.01)

(58) Field of Classification Search
CPC .. H04M 1/026; G06K 13/0831; H04B 1/3816
USPC .................. 439/152, 155, 157, 630, 160, 310
See application file for complete search history.

(56) References Cited

U.S. PATENT DOCUMENTS

| | | | | |
|---|---|---|---|---|
| 6,366,442 B1* | 4/2002 | Onodera | ................ | G05G 5/005 307/10.1 |
| 6,685,489 B1* | 2/2004 | Rubenstein | .......... | H05K 7/1409 439/157 |
| 2006/0014407 A1* | 1/2006 | Wahler | ................... | G06K 13/08 439/159 |
| 2009/0124104 A1* | 5/2009 | Zhu | ........................ | G06K 19/07 439/131 |
| 2015/0118884 A1* | 4/2015 | Hu | ........................ | H04B 1/3816 439/310 |
| 2015/0156911 A1* | 6/2015 | Hu | ........................ | H04B 1/3816 361/754 |

* cited by examiner

*Primary Examiner* — Abdullah Riyami
*Assistant Examiner* — Nelson R Burgos-Guntin
(74) *Attorney, Agent, or Firm* — Novak Druce Connolly Bove + Quigg LLP

(57) ABSTRACT

An electronic device includes a housing and an electronic card connector. The housing includes a supporting wall and a number of peripheral sidewalls. The supporting wall and the number of peripheral sidewalls define an accommodating space. The peripheral sidewall defines a first through hole and a second through hole. The electronic card connector includes a tray being received in the accommodating space, a first geared rack being received in the second through hole, a cylinder gear being rotatably coupled to the supporting wall and meshed with the first geared rack, and a second geared rack being coupled to the supporting wall and meshed with the cylinder. The tray is supported by the second geared rack. The cylinder gear and the second geared rack can be both driven to move to eject the tray ejected from the accommodating space.

18 Claims, 6 Drawing Sheets

ELECTRONIC DEVICE HAVING ELECTRONIC CARD CONNECTOR

FIELD

The subject matter herein generally relates to an electronic device having an electronic card connector.

BACKGROUND

Electronic card connector, such as Subscriber Identity Model card (SIM card), Secure Digital Memory Card (SD card), or like can be inserted into an electronic device, so that the electronic device can communicate with other electronic device or store information.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
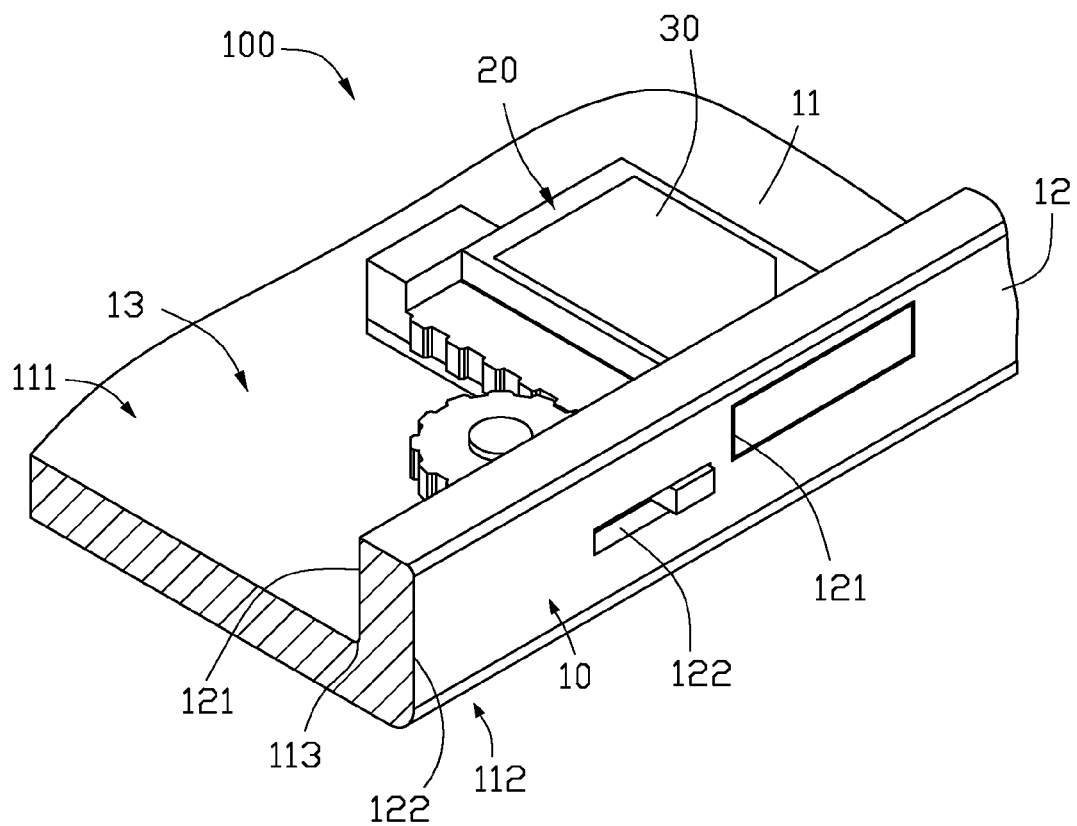
FIG. 1 is a partial, isometric view of an embodiment of an electronic device having an electronic card connector in one direction.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
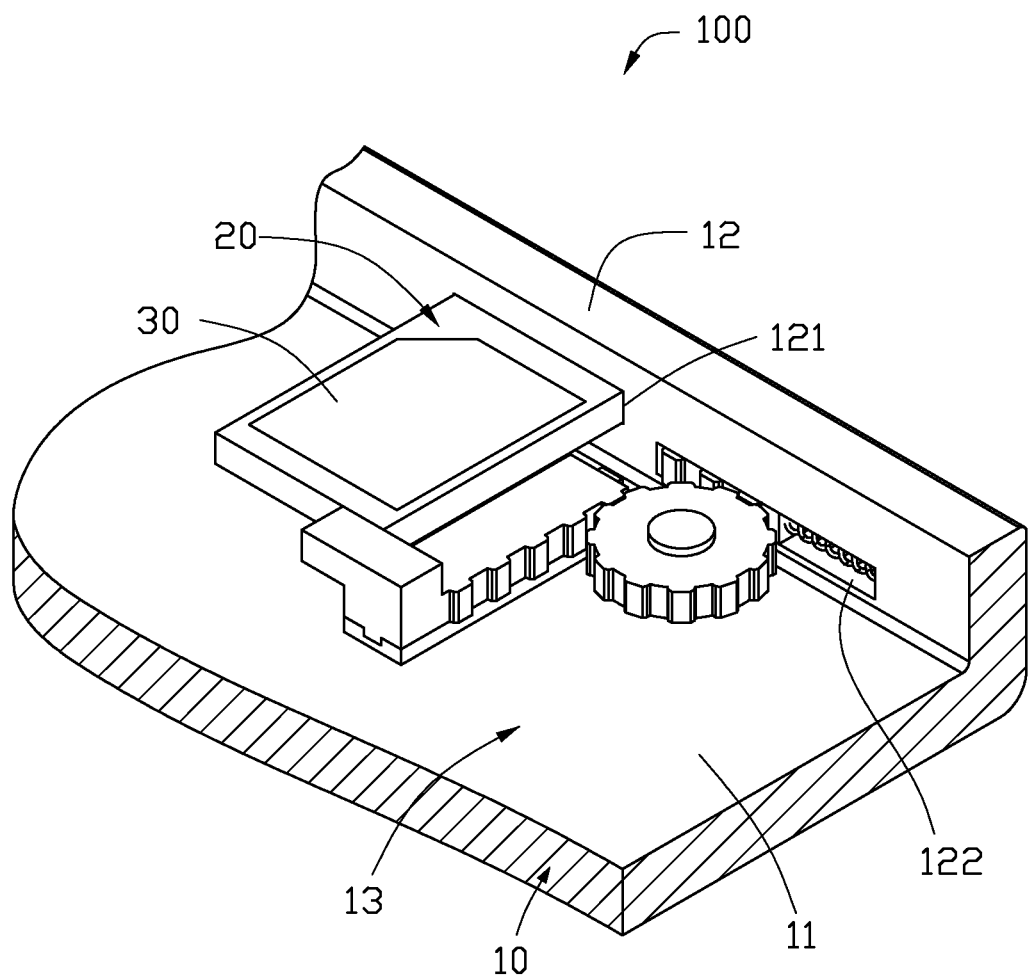
FIG. 2 is similar to FIG. 1, but viewed from another angle.

FIGS. 1 and 2 show an electronic device 100. The electronic device 100 can include a housing 10 and an electronic card connector 20. The electronic device 100 can also include other functional modules to fulfill different functions. However, it is not shown and specifically described for simplification.

The housing 10 can include a supporting wall 11, a peripheral sidewall 12 and other peripheral sidewalls (no visible). The supporting wall 11 has a first inner surface 111 and a first outside surface 112. The first inner surface 111 is defined by a plurality of supporting wall inner surface edges 113. The peripheral sidewall 12 and the other peripheral sidewalls are extending away from the supporting wall 11 at two or more of the supporting wall inner surface edges 113. The supporting wall 11, the peripheral sidewall 12 and the other peripheral sidewalls can cooperatively define an accommodating space 13 which is used for accommodating the electronic card connector 20. Each of the peripheral sidewalls have a second inner surface 121 facing the accommodating space 13 and a second outer surface 122 opposite to and substantially parallel to the second inner surface 121.

The peripheral sidewall 12 defines a first through hole 121 and a second through hole 122 adjacent to the first through hole 121. The first though hole 121 and the second through hole 122 are positioned on the peripheral wall 12 close to the supporting wall 11 and extend from the second outer surface 121 of the peripheral wall 12 to the second inner surface 122 of the peripheral wall 12

Figure 3:
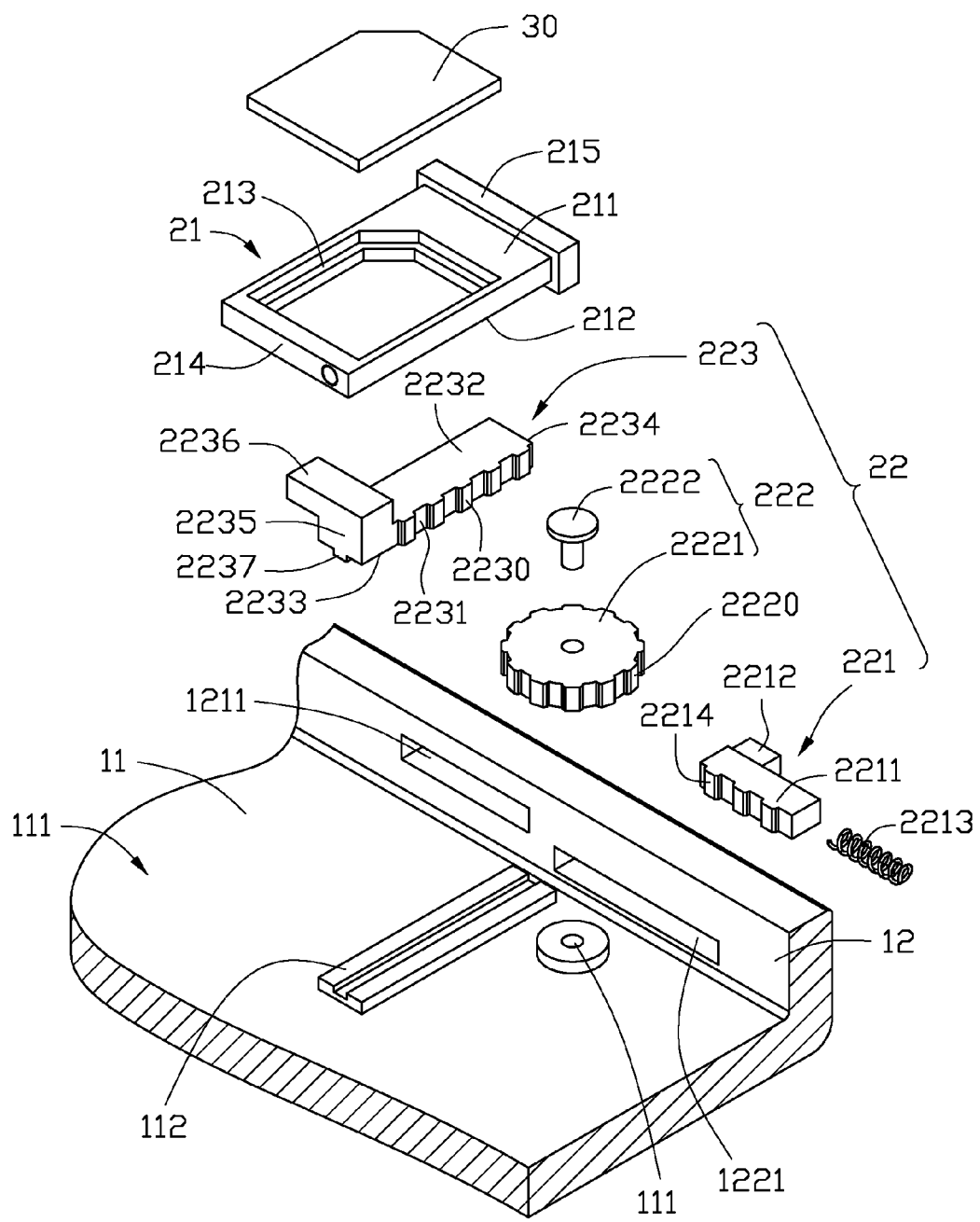
FIG. 3 is an exploded isometric view of the electronic device shown in FIG. 1.
Figure 4:
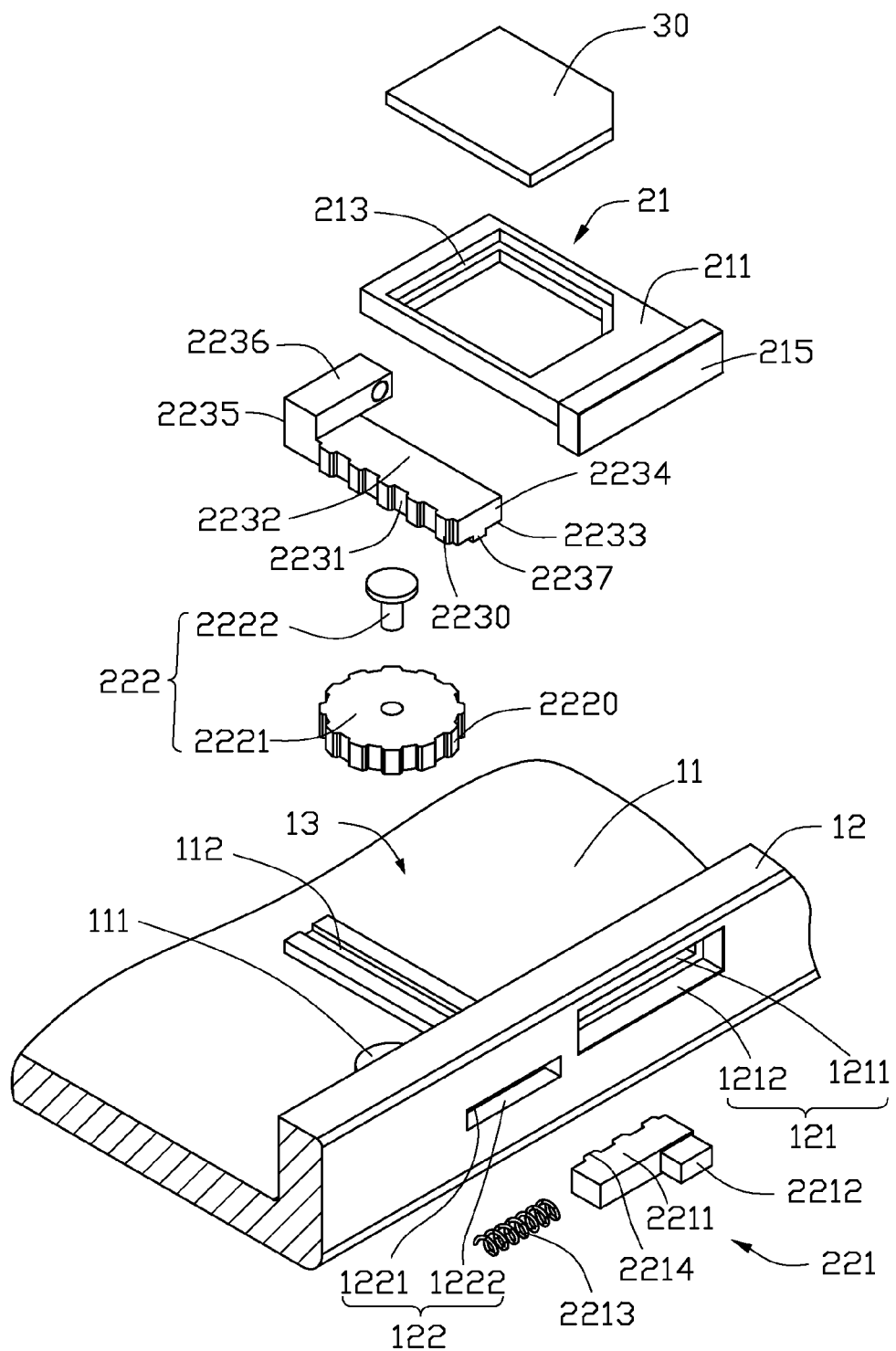
FIG. 4 is similar to FIG. 3, but viewed from another angle.

Referring to FIGS. 3 and 4, in this embodiment, the first through hole 121 and the second through hole 122 can be both long and narrow. The first through hole 121 can have a first side 1211 close to the supporting wall 11 and a second side 1212 away from the supporting wall 11. The height of first side 1211 is less than that of the second side 1212. The second through hole 122 can have a third side 1221 close to the supporting wall 11 and a fourth side 1222 away from the supporting wall 11. The height of third side 1221 is greater than that of the fourth side 1222.

The electronic card connector 20 can include a movable tray 21 and a transmission module 22.

The tray 21 can have a first upper surface 211 and a first lower surface 212 opposite to the first upper surface 211. The tray 21 can define a defined space 213 on the first upper surface 211. The defined space 213 is used for accommodating an electronic card 30. The tray 21 can further include a first end 214 and a shoulder 215 opposite to the first end 214. The height of the shoulder 215 is greater than that of the first side 1211 and less than that of the second side 1212.

The transmission module 22 can include a first transmission assembly 221, a second transmission assembly 222 and a third transmission assembly 223.

The first transmission assembly 221 can include a first geared rack 2211, a sliding portion 2212 protruding from the first geared rack 2211 and a spring 2213. In this embodiment, the first geared rack 2211 and the sliding portion 2212 can be integrated. In at least one embodiment, the first geared rack 2211 can be coupled to the sliding portion 2212.

In detail, the first geared rack 2211 is slidably positioned along the second through hole 122 with a portion of the first geared rack 2211 extending from the accommodating space 13 through the second through hole 121, and the first geared rack 2211 can further have a number of first gears 2214. The height of the sliding portion 2212 is less than that of the third side 1221 and the fourth side 1222. The sliding portion 2212 can receive in the fourth side 1222 and further can be driven to slide in the fourth side 1222. The height of the first geared rack 2211 is less than that of the third side 1221 and greater than that of the fourth side 1222. The first geared rack 2211 can receive in the third side 1221. The spring 2213 can also receive in the third side 1221 and resist on the first geared rack 2211. The first geared rack 2211 can be driven to slide in the third side 1221 and the spring 2213 can drive the first geared rack 2211 to return.

The second transmission assembly 222 can include a cylinder gear 2221. The cylinder gear 221 can be rotatably coupled to the supporting wall 11. The cylinder gear 221 can be attached to the first inner surface 111 of the supporting wall 11 and meshed with gears 2214 of the first geared rack 2211. The cylinder gear 2221 can be driven to rotate by the first geared rack 2211 about a direction perpendicular to the supporting wall 11.

In detail, the housing 10 can further include a boss 111 which is protruding from the supporting wall 11 and adjacent to the second through hole 122. The second transmission assembly 222 can further include a mounting screw 2222. The cylinder gear 2221 can be mounted on the boss 113 via the mounting screw 2222. The cylinder gear 2221 can rotate about an axis of the mounting screw 2222.

The third transmission assembly 223 can be a second geared rack 2231. The second geared rack 2231 can have gears 2230 that can be meshed with the cylinder gear 2221 and driven to slide by the cylinder gear 2221.

In detail, the second geared rack 2231 can have an upper surface 2232 being coupled to the movable tray 21, a lower surface 2233 opposite to the upper surface 2232 and slidably coupled to the first inner surface 111 of the supporting wall 111 and substantially parallel to the upper surface 2232, a second end 2234 close to the peripheral sidewall 12 and a third end 2235 away from the peripheral sidewall 12. The second geared rack 2231 can include a resisting portion 2236 locating on the third end 2235 and protruding from the upper surface 2232. When the tray 21 is partially passed through the first through hole 121 and penetrated into the accommodating space 13, the lower surface 212 of the tray 21 is located on the upper surface 2232, the first end 214 of the tray 21 is resisted on the resisting portion 2236.

The second geared rack 2231 can further include a guiding rail 2237 protruding from the lower surface 2233 of the second geared rack 2231. The longitudinal direction of the guiding rail 2237 is perpendicular to the peripheral sidewall 12. The housing 10 can further include a guide slot 112 protruding from the supporting wall 11. When the guiding rail 2233 is engaged with the guide slot 112, the second geared rack 2231 can slide along the longitudinal direction of the guiding rail 2237 with the guide of the guiding rail 2233.

Furthermore, in this embodiment, the second geared rack 2231 is close to the first through hole 121. In detail, the distance between the second end 2234 and the third end 2235 is less than that of between the sidewall 12 and the third end 2235.

In at least one embodiment, the first end 214 and the resisting portion 2236 can be both magnetized so that the first end 214 can be attached to the resisting portion 2236.

Figure 5:
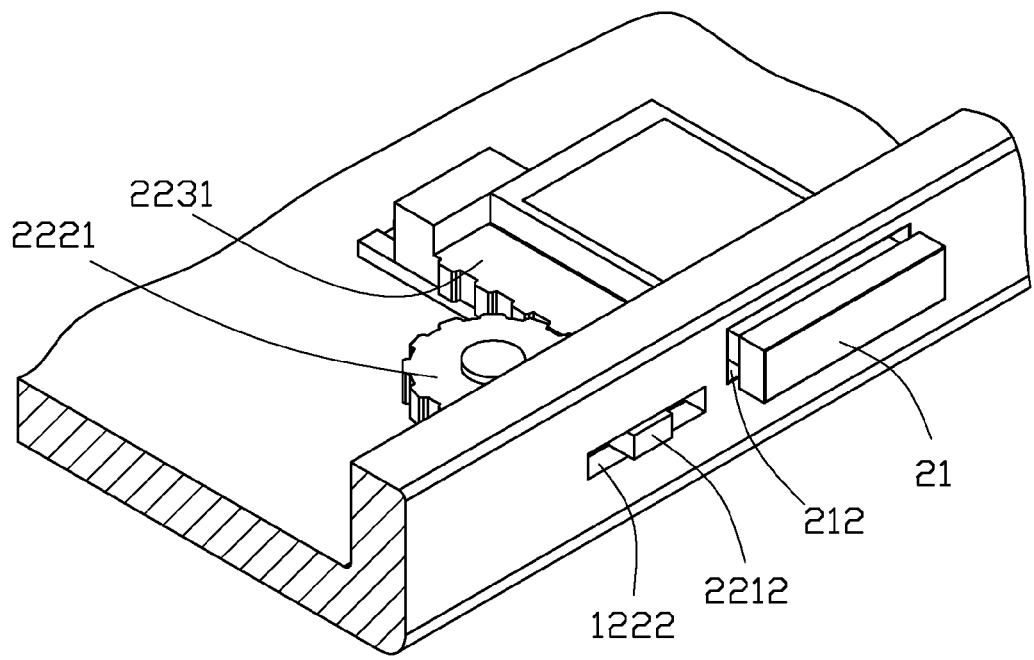
FIG. 5 is a motion state isometric diagram of the electronic device shown in FIG. 1.
Figure 6:
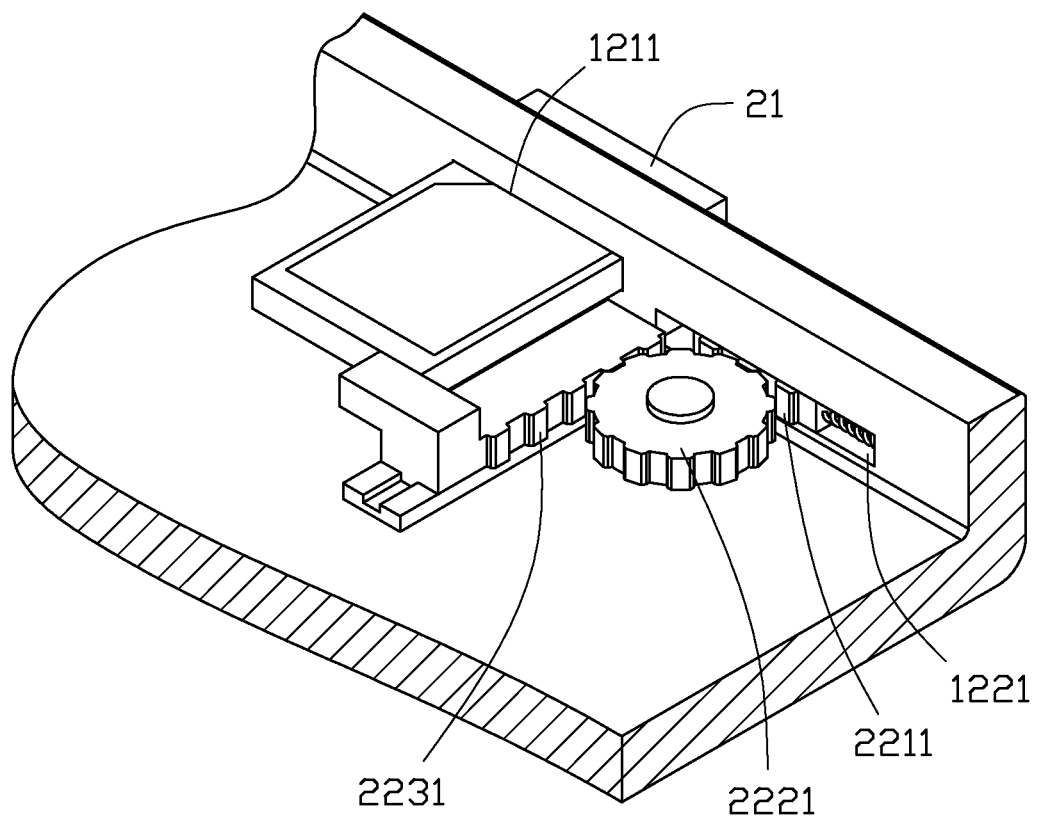
FIG. 6 is similar to FIG. 5, but viewed from another angle.

Referring to FIGS. 5 and 6. When in assembly, the first geared rack 2211 can be mounted in the third side 1221, the spring 2213 can be also mounted in the third side 1221 and resisted on the first geared rack 2211, the sliding portion 2212 can be mounted in the fourth side 1222 and close to the first through hole 121. The cylinder gear 2221 can be mounted on the boss 111 via the mounting screw 2222. The second geared rack 2231 can be mounted on the supporting wall 11. The cylinder gear 2221 can be meshed with the first geared rack 2211. The second geared rack 2231 can be meshed with the cylinder gear 2221. The tray 21 can be pushed to pass through the first through hole 121 so that the lower surface 212 of the tray 21 can be located on the upper surface 2232 of the second geared rack 2231, the first end 214 of the tray 21 can be resisted on the resisting portion 2236 of the second geared rack 2231, and the shoulder 215 of the tray 21 can be received in fourth side 1222 of the first through hole 121. Now, the electronic card connector 20 is in a locked state.

When in the locked state. the sliding portion 2212 can be driven to slide in the fourth side 1222 toward a direction away from the first through hole 121, the rectilinear movement of the sliding portion 2212 cause the rectilinear movement of the first geared rack 2211, and the rectilinear movement of the first geared rack 2211 cause the circular movement of the cylinder gear 2221, and the circular movement of the cylinder gear 2221 cause the rectilinear movement of the second geared rack 2231. What the result of the rectilinear movement of the second geared rack 2231 is to eject the tray 21 from the first through hole 121. Then, the electronic card connector 20 is in an unlocked state, and the electronic card 30 can be taken out from the defined space 213.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
a housing and an electronic card connector, the housing comprising a supporting wall and a plurality of peripheral sidewalls, the supporting wall and the plurality of peripheral sidewalls defining an accommodating space, one of the plurality of peripheral sidewalls defining a first through hole and a second through hole, the electronic card connector comprising:
a tray defining a defined space for accommodating an electronic card, the tray passing through the first through hole and receiving in the accommodating space; and
a first geared rack received in the second through hole;
a cylinder gear rotatably coupled to the supporting wall and meshed with the first geared rack; and
a second geared rack being coupled to the supporting wall and the tray, the second geared rack meshing with the cylinder gear;
when the first geared rack is driven to slide in the second through hole, the cylinder gear and the second geared rack are both driven to move until the tray is ejected from the first through hole.

2. The electronic device as described in claim 1, wherein the first through hole has a first side close to the supporting wall and a second side away from the supporting wall, the height of first side is less than that of the second side, the tray comprises a first end and a shoulder opposite to the first end, the height of the shoulder is greater than that of the first side and less than that of the second side, when the tray is received in the accommodating space, the shoulder is received in the second side of the first through hole.

3. The electronic device as described in claim 1, wherein the second through hole has a third side close to the supporting wall and a fourth side away from the supporting wall, the height of the first geared rack is less than that of the third side and greater than that of the fourth side, the first geared rack is received in the third side of the second through hole, the transmission module further comprises a spring receiving in the third side of the second through hole and resisting on the first geared rack; when the first geared rack is driven to slide in the third side of second through hole, the spring is capable of driving the first geared rack to return.

4. The electronic device as described in claim 3, wherein the transmission module further comprises
   a sliding portion protruding from the first geared rack and receiving in the fourth side of second through hole, and the sliding portion is capable of being driven to slide in the fourth side of the second through hole.

5. The electronic device as described in claim 1, wherein the electronic card connector further comprises
   a mounting screw, the cylinder gear is mounted on the boss via the mounting screw, and the cylinder gear is capable of rotating about an axis of the mounting screw.

6. The electronic device as described in claim 5, wherein the housing further comprises a boss protruding from the supporting wall, and the cylinder gear is mounted on the boss via the mounting screw.

7. The electronic device as described in claim 2, wherein the second geared rack has an upper surface, a lower surface opposite to the upper surface, a second end close to the peripheral sidewall and a third end away from the peripheral sidewall, the second geared rack comprises a resisting portion locating on the third end and protrudes from the upper surface of the second geared rack, when the tray is received into the accommodating space, the tray is located on the upper surface of the second geared rack, the first end of the tray is resisted on the resisting portion.

8. The electronic device as described in claim 7, wherein the first end of the tray and the resisting portion of the second geared rack are both magnetized so that the first end of the tray is capable of attaching to the resisting portion of the second geared rack.

9. The electronic device as described in claim 7, wherein the second geared rack further comprises a guiding rail protruding from the lower surface of the second geared rack, an longitudinal direction of the guiding rail is perpendicular to the peripheral sidewall, the housing further includes a guide slot protruding from the supporting wall, the guiding rail is engaged with the guide slot.

10. An electronic device with an electronic card connector comprising:
    a housing, the housing having:
        a supporting wall with a first outer surface and a first inner surface, the inner surface of the supporting wall being defined by a plurality of supporting wall inner surface edges; and
        a plurality of peripheral sidewalls extending away from the supporting wall at two or more of the supporting wall inner surface edges, with one of the peripheral side walls defining a first through hole and a second through hole;
        wherein, the supporting wall and plurality of peripheral sidewalls define an accommodating space, with each of the peripheral side walls having a second inner surface facing the accommodating space and a second outer surface opposite to and substantially parallel to the second inner surface; and
        wherein, the first though hole and the second through hole are positioned on the through-holed peripheral wall close to the supporting wall and extend from the second outer surface of through-holed peripheral wall to second inner surface of the through-holed peripheral wall;
    a movable tray having a defined space for receiving the electronic card;
    a second geared rack having a lower surface slidably coupled to the first inner surface of the supporting wall, the second geared rack having an upper surface, opposite to and substantially parallel to the lower surface of the second geared rack, the upper surface of the second geared rack being coupled to the movable tray;
    a rotatable cylinder gear attached to the first inner surface of the supporting wall and meshing with gears of the second geared rack; and
    a first geared rack slidably position along the first through hole with a portion of the first geared rack extending from the accommodating space through the second first through hole, the first geared rack having gears meshing the rotatable cylinder gear;
        wherein, when the first geared rack is slide along the second through hole, the cylinder gear is engaged and turned and the cylinder gear engages the second geared rack moving the movable tray.

11. The electronic device as described in claim 10, wherein the first through hole has a first side close to the supporting wall and a second side away from the supporting wall, the height of first side is less than that of the second side, the tray comprises a first end and a shoulder opposite to the first end, the height of the shoulder is greater than that of the first side and less than that of the second side, when the tray is received in the accommodating space, the shoulder is received in the second side of the first through hole.

12. The electronic device as described in claim 10, wherein the second through hole has a third side close to the supporting wall and a fourth side away from the supporting wall, the height of the first geared rack is less than that of the third side and greater than that of the fourth side, the first geared rack is received in the third side of the second through hole, the transmission module further comprises a spring receiving in the third side of the second through hole and resisting on the first geared rack; when the first geared rack is driven to slide in the third side of second through hole, the spring is capable of driving the first geared rack to return.

13. The electronic device as described in claim 12, wherein the electronic device further comprises
    a sliding portion protruding from the first geared rack and receiving in the fourth side of second through hole, and the sliding portion is capable of being driven to slide in the fourth side of the second through hole.

14. The electronic device as described in claim 10, wherein the electronic device further comprises
    a mounting screw, the cylinder gear is mounted on the boss via the mounting screw, and the cylinder gear is capable of rotating about an axis of the mounting screw.

15. The electronic device as described in claim 14, wherein the housing further comprises a boss protruding from the supporting wall, and the cylinder gear is mounted on the boss via the mounting screw.

16. The electronic device as described in claim 11, wherein the second geared rack has an upper surface, a lower surface opposite to the upper surface, a second end close to the peripheral sidewall and a third end away from the peripheral sidewall, the second geared rack comprises a resisting portion locating on the third end and protrudes from the upper surface of the second geared rack, when the tray is received into the accommodating space, the tray is located on the upper surface of the second geared rack, the first end of the tray is resisted on the resisting portion.

17. The electronic device as described in claim 16, wherein the first end of the tray and the resisting portion of the second geared rack are both magnetized so that the first end of the tray is capable of attaching to the resisting portion of the second geared rack.

18. The electronic device as described in claim 16, wherein the second geared rack further comprises a guiding rail protruding from the lower surface of the second geared rack, an longitudinal direction of the guiding rail is perpendicular to the peripheral sidewall, the housing further includes a guide slot protruding from the supporting wall, the guiding rail is engaged with the guide slot.

* * * * *